(12) United States Patent  (10) Patent No.: US 9,313,565 B2
Kishinami et al.  (45) Date of Patent: Apr. 12, 2016

(54) PORTABLE TERMINAL DEVICE HAVING SOUND EMISSION HOLE WHICH CHANGES ORIENTATION BASED ON ROTATION OF CASING ABOUT BIAXIAL HINGE

(75) Inventors: Yuichiro Kishinami, Kanagawa (JP); Yasuharu Onishi, Kanagawa (JP); Motoyoshi Komoda, Kanagawa (JP); Nobuhiro Kawashima, Kanagawa (JP); Yukio Murata, Kanagawa (JP); Jun Kuroda, Kanagawa (JP); Shigeo Satou, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 478 days.

(21) Appl. No.: 13/703,131

(22) PCT Filed: Jul. 21, 2011

(86) PCT No.: PCT/JP2011/004110
§ 371 (c)(1),
(2), (4) Date: Dec. 10, 2012

(87) PCT Pub. No.: WO2012/014411
PCT Pub. Date: Feb. 2, 2012

(65) Prior Publication Data
US 2013/0077812 A1  Mar. 28, 2013

(30) Foreign Application Priority Data

Jul. 29, 2010  (JP) .................................. 2010-171006

(51) Int. Cl.
*H04R 1/02*  (2006.01)
*H04M 1/02*  (2006.01)
*H04M 1/03*  (2006.01)
*H04M 1/60*  (2006.01)

(52) U.S. Cl.
CPC ............... *H04R 1/02* (2013.01); *H04M 1/0212* (2013.01); *H04M 1/035* (2013.01); *H04M 1/6041* (2013.01)

(58) Field of Classification Search
None
See application file for complete search history.

(56) References Cited

U.S. PATENT DOCUMENTS 5,832,079 A * 11/1998 Rabe .......................... 379/433.13
5,890,072 A *  3/1999 Rabe .......................... 455/550.1
5,963,640 A * 10/1999 Rabe .......................... 379/433.02

(Continued)

FOREIGN PATENT DOCUMENTS

CN  1845558 A  10/2006
CN  101090408 A  12/2007

(Continued)

OTHER PUBLICATIONS

Communication dated Jul. 17, 2014, issued by the State Intellectual Property Office of the People's Republic of China in counterpart Application No. 201180037176.9.

*Primary Examiner* — Thang Tran
*Assistant Examiner* — Mark Fischer
(74) *Attorney, Agent, or Firm* — Sughrue Mion, PLLC (57) ABSTRACT

A portable terminal device has first and second casings (1, 2) and a biaxial hinge (3) coupling the first and second casings (1, 2). The portable terminal device also has a speaker (60) provided in the first casing (1) or the biaxial hinge (3), a sound emission hole (4), a waveguide (5) guiding a sound wave to the sound emission hole (4), and a display device (6) provided for the second casing (2). A display screen (6a) of the display device (6) and the sound emission hole (4) are disposed in a face (2a) whose orientation changes when the second casing (2) turns about a second axis, in the second casing (2).

7 Claims, 8 Drawing Sheets

(56) References Cited

U.S. PATENT DOCUMENTS

| | | | |
|---|---|---|---|
| 2002/0052216 A1* | 5/2002 | Song | 455/550 |
| 2007/0032271 A1* | 2/2007 | Chan et al. | 455/569.1 |
| 2007/0178943 A1* | 8/2007 | Na | 455/569.1 |
| 2011/0152729 A1* | 6/2011 | Oohashi et al. | 601/2 |

FOREIGN PATENT DOCUMENTS

| | | | | |
|---|---|---|---|---|
| JP | 11030226 A | * | 2/1999 | F16C 11/10 |
| JP | 2000-517129 A | | 12/2000 | |
| JP | 2001339791 A | * | 12/2001 | H04R 17/00 |
| JP | 2005023958 A | * | 1/2005 | F16C 11/04 |
| JP | 2005-110115 A | | 4/2005 | |
| JP | 2006067084 A | * | 3/2006 | H04M 1/03 |
| JP | 2006-157109 A | | 6/2006 | |
| JP | 2007-282292 A | | 10/2007 | |
| JP | 2010-074440 A | | 4/2010 | |
| WO | 98/09413 A | | 3/1998 | |
| WO | 2006068122 A1 | | 6/2006 | |

* cited by examiner

PORTABLE TERMINAL DEVICE HAVING SOUND EMISSION HOLE WHICH CHANGES ORIENTATION BASED ON ROTATION OF CASING ABOUT BIAXIAL HINGE

CROSS REFERENCE TO RELATED APPLICATIONS

This application is a National Stage of International Application No. PCT/JP2011/004110 filed Jul. 21, 2011, claiming priority based on Japanese Patnet Application No. 2010-171006 filed Jul. 29, 2010, the contents of all of which are incorporated herein by reference in their entirety.

TECHNICAL FIELD

The present invention relates to a portable terminal device.

BACKGROUND ART

In recent years, demand for portable terminal devices such as a cellular phone and a laptop computer is increasing. In particular, development of a thin portable terminal device having a commodity value of acoustic functions such as television telephone, moving picture reproduction, and handsfree telephone function is being advanced.

There is a portable terminal device of a type in which first and second casings are coupled to each other via a biaxial hinge. The biaxial hinge axially supports the first and second casings about a first axis so that they are turnable, and axially supports the second casing with respect to the first casing turnably about a second axis which crosses the first axis. In the case of providing a display device in the second casing in such a portable terminal device of a biaxial hinge type, as the second casing turns about the second axis, the orientation of a display screen of the display device also turns (for example, Patent Document 1).

Patent Document 2 describes a technique of forming a waveguide which guides a sound wave generated from a speaker, in a hinge of a foldable cellular phone. Patent Document 3 describes a technique of forming a waveguide for collecting voice by a microphone in a hinge of a wireless telephone.

RELATED DOCUMENT

Patent Document

PATENT DOCUMENT 1: Japanese Patent Application Laid-Open No. 2010-074440
PATENT DOCUMENT 2: Japanese Patent Application Laid-Open No. 2005-110115
PATENT DOCUMENT 3: Japanese Patent Application National Publication (Laid-Open) No. 2000-517129

SUMMARY OF THE INVENTION

In recent years, it is common to provide a portable terminal device with a display device, and in some cases, sound is output from a speaker interlockingly with display of an image in the display device.

Since a portable terminal device is always requested for miniaturization, there are many restrictions in layout of components in first and second casings. Consequently, there is a case that a space for disposing a speaker for outputting sound interlockingly with display of an image cannot be assured in the second casing which is provided with the display device.

In this case, the speaker and its sound emission hole are disposed in the first casing. In the case where the speaker and the sound emission hole are disposed in such a manner, there is the possibility that the orientation of the second casing about the second axis and the emission direction of sound from the speaker are not synchronized and the user feels strange in hearing the sound.

An object of the present invention is to provide a portable terminal device in which first and second casings are coupled to each other via a biaxial hinge, wherein the orientation of the second casing about the second axis and the emission direction of sound from the speaker provided in the first casing are interlocked.

According to the present invention, there is provided a portable terminal device including: a first casing; a second casing; a biaxial hinge mutually coupling the first and second casings, axially supporting the first and second casings about a first axis so that the first and second casings can open and close each other, and axially supporting the second casing with respect to the first casing turnably about a second axis which crosses the first axis; a speaker provided in the first casing or the biaxial hinge; a sound emission hole from which sound waves generated from the speaker are emitted; a waveguide guiding the sound waves generated from the speaker to the sound emission hole; and a display device provided for the second casing, wherein each of a display screen of the display device and the sound emission hole is disposed in a face whose orientation changes when the second casing turns about the second axis, in the second casing.

According to the present invention, in a portable terminal device in which first and second casings are coupled to each other via a biaxial hinge, the orientation of the second casing about the second axis and the emission direction of sound from the speaker provided in the first casing may be interlocked.

BRIEF DESCRIPTION OF THE DRAWINGS

The above and other objects, features, and advantages will become more apparent from the following preferred embodiments and the following appended drawings.

DESCRIPTION OF EMBODIMENTS

Embodiments of the present invention will be described with reference to the drawings. In all of the drawings, the same reference numerals are designated to similar components and repetitive description will not be made.

First Embodiment

Figure 1:
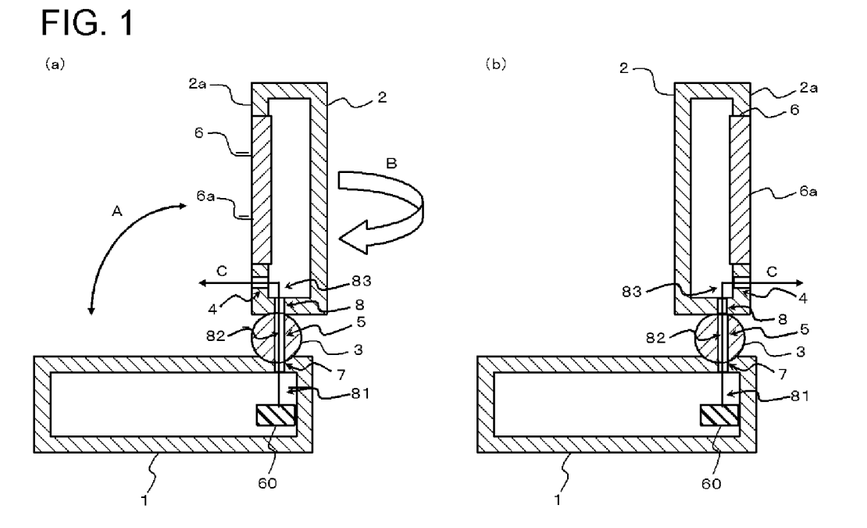
FIGS. 1(a) and 1(b) are schematic sectional side views of a portable terminal device according to a first embodiment.
Figure 2:
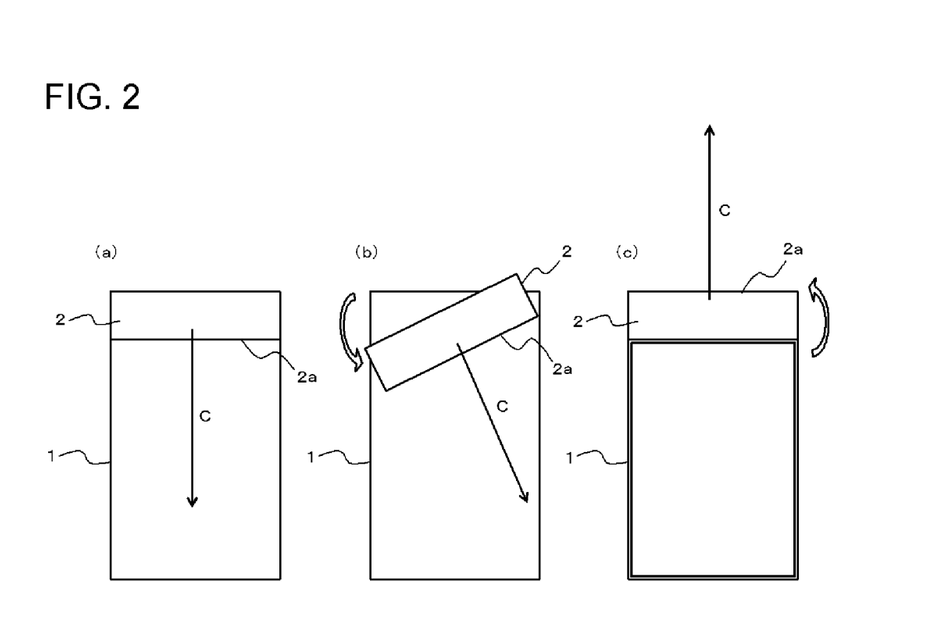
FIGS. 2(a), 2(b), and 2(c) are schematic plan views of the portable terminal device according to the first embodiment.

FIGS. 1(a) and 1(b) are schematic sectional side views of a portable terminal device according to a first embodiment. The orientation of a second casing 2 in FIG. 1(a) and that in FIG. 1(b) are opposite to each other. FIGS. 2(a), 2(b), and 2(c) are schematic plan views of the portable terminal device according to the first embodiment. FIG. 2(a) is a plan view of the state of FIG. 1(a), FIG. 2(c) is a plan view of the state of FIG. 1(b), and FIG. 2(b) illustrates an intermediate state of FIGS. 2(a) and 2(c).

The portable terminal device according to the first embodiment has a first casing 1, the second casing 2, and a biaxial hinge 3 coupling the first and second casings 1 and 2. The biaxial hinge 3 axially supports the first and second casings 1 and 2 about a first axis so that the first and second casings 1 and 2 can open and close to each other, and axially supports the second casing 2 with respect to the first casing 1 so as to be turnable around a second axis which crosses the first axis. The portable terminal device also has a speaker 60 provided in the first casing 1 or the biaxial hinge 3, a sound emission hole 4 from which sound waves generated from the speaker 60 are emitted, a waveguide 5 which guides the sound waves generated from the speaker 60 to the sound emission hole 4, and a display device 6 provided in the second casing 2. A display screen 6a of the display device 6 and the sound emission hole 4 are disposed in a face 2a whose orientation changes when the second casing 2 turns about the second axis. The portable terminal device is, for example, a cellular phone, a personal digital assistant (PDA), a small game device, a laptop personal computer, or the like. The embodiment will now be described in detail.

Each of the first and second casings 1 and 2 is formed in, for example, a flat rectangular parallelepiped shape. The first and second casings 1 and 2 are coupled to each other via the biaxial hinge 3.

The biaxial hinge 3 axially supports the first and second casings 1 and 2 so as to be opened/closed to each other about the first axis. Consequently, the first and second casings 1 and 2 can be opened/closed to each other in the direction of arrow A in FIG. 1(a).

Moreover, the biaxial hinge 3 axially supports the second casing 2 to the first casing 1 about the second axis which crosses (for example, at right angle) the first axis. Consequently, the second casing 2 is turnable relative to the first casing 1 in the direction of arrow B in FIG. 1(a).

In the case of the embodiment, the speaker 60 is provided in the first casing 1. On the other hand, the sound emission hole 4 from which sound waves generated by the speaker 60 are emitted is formed in the second casing 2.

In the case of the embodiment, the waveguide 5 which guides the sound waves generated from the speaker 60 to the sound emission hole 4 is formed in the first casing 1, the biaxial hinge 3, and the second casing 2 (the details will be described later).

The sound wave generated by the speaker 60 travels through the waveguide 5 and the sound emission hole 4 in this order and is emitted from the second casing 2 to the outside. The waveguide 5 is constructed to guide the sound wave generated by the speaker 60 to the sound emission hole 4 regardless of a turn phase about the second axis of the second casing 2, of the first casing 1.

The portable terminal device has, for example, a TV viewing function or the like and may output sound from the speaker 60 interlockingly with display of a video image in the display screen 6a.

The display device 6 is, for example, a liquid crystal display device. The display screen 6a of the display device 6 is disposed in a face in which the sound emission hole 4 is formed, in the second casing 2. Consequently, when the second casing 2 is turned about the second axis, the orientation of the sound emission hole 4 also changes interlockingly with the orientation of the display screen 6a. That is, in the embodiment, the orientation of the display screen 6a and that of the sound emission hole 4 are always the same. Therefore, in any of the state of FIGS. 1(a) and 2(a), the state of FIG. 2(b), and the state of FIGS. 1(b) and 2(c), sound is emitted always to the front of the display screen 6a (the direction of arrow C).

At least any one of the first and second casings 1 and 2 (for example, the first casing 1) may be provided with an operation unit (not illustrating) including, for example, operation keys. At least any one of the first and second casings 1 and 2 (for example, both of the first and second casings 1 and 2) may be provided with a circuit board. The speaker 60 is also an example of a component which is preferably provided on the circuit board.

Figure 3:
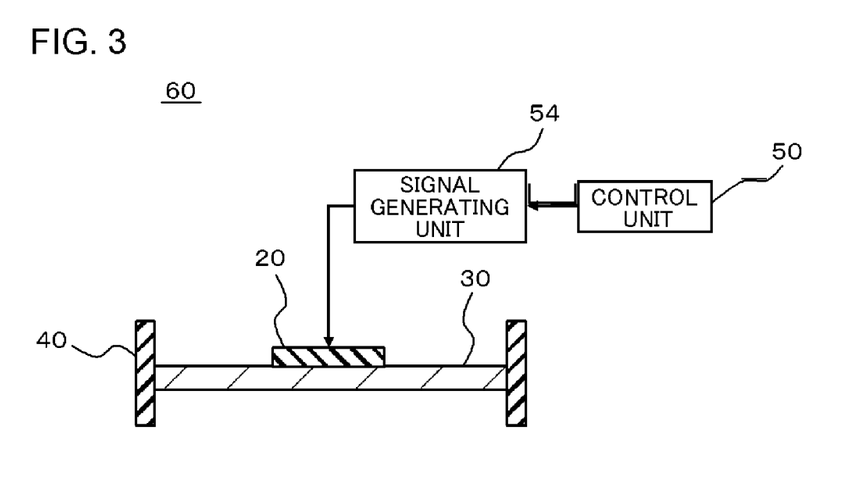
FIG. 3 is a schematic view of a speaker of the portable terminal device according to the first embodiment.

FIG. 3 is a schematic view of the speaker 60.

The speaker 60 has, for example, a sheet-shaped oscillating member 30, an oscillator 20, supporting member 40, a signal generating unit 54, and a control unit 50. The oscillator 20 is, for example, a piezoelectric oscillator and is attached to one of faces of the oscillating member 30. The supporting members 40 support the periphery of the oscillating member 30. The signal generating unit 54 and the control unit 50 form an oscillation circuit (input unit) which oscillates the oscillator 20 by supplying an oscillation signal to the oscillator 20 to make sound waves oscillated by the oscillator 20 and the oscillating member 30.

The oscillating member 30 is oscillated by oscillation generated by the oscillator 20 and oscillates sound waves having a frequency of, for example, 20 kHz or higher. The oscillator 20 oscillates itself, thereby oscillating sound waves having a frequency of, for example, 20 kHz or higher. The oscillating member 30 adjusts fundamental resonance frequency of the oscillator 20. The fundamental resonance frequency of a mechanical oscillator depends on load weight and compliance. Since the compliance is mechanical rigidity of the oscillator, by controlling the rigidity of the oscillating member 30, the fundamental resonance frequency of the oscillator 20 can be controlled. The thickness of the oscillating member 30 is preferably equal to or larger than 5 μm and equal to or less than 500 μm. The longitudinal elastic modulus as an index of rigidity of the oscillating member 30 is preferably equal to or larger than 1 Gpa and equal to or less than 500 GPa. In the case where rigidity of the oscillating member 30 is too low or too high, there is the possibility that the characteristic or reliability of the mechanical oscillator deteriorates. The material of the oscillating member 30 is not limited as long as the material has high elastic modulus like metal, resin, or the like with respect to the oscillator 20 as a brittle material. From the viewpoint of workability and cost, phosphor bronze, stainless steel, or the like is preferable.

In the embodiment, the plane shape of the oscillator 20 is circle. The plane shape of the oscillator 20 is not limited to circle. The entire face opposed to the oscillating member 30, of the oscillator 20 is fixed to the oscillating member 30 by an adhesive. In such a manner, the entire one side of the oscillator 20 is restrained by the oscillating member 30.

The signal generating unit 54 generates an electric signal, for example, a modulation signal in a parametric speaker, which is supplied to the oscillator 20. The carrier wave of the modulation signal is an ultrasonic wave whose frequency is, for example, 20 kHz or higher and is, concretely, an ultrasonic wave of, for example, 100 kHz. The control unit 50 controls the signal generating unit 54 in accordance with a voice signal supplied from the outside.

Figure 4:
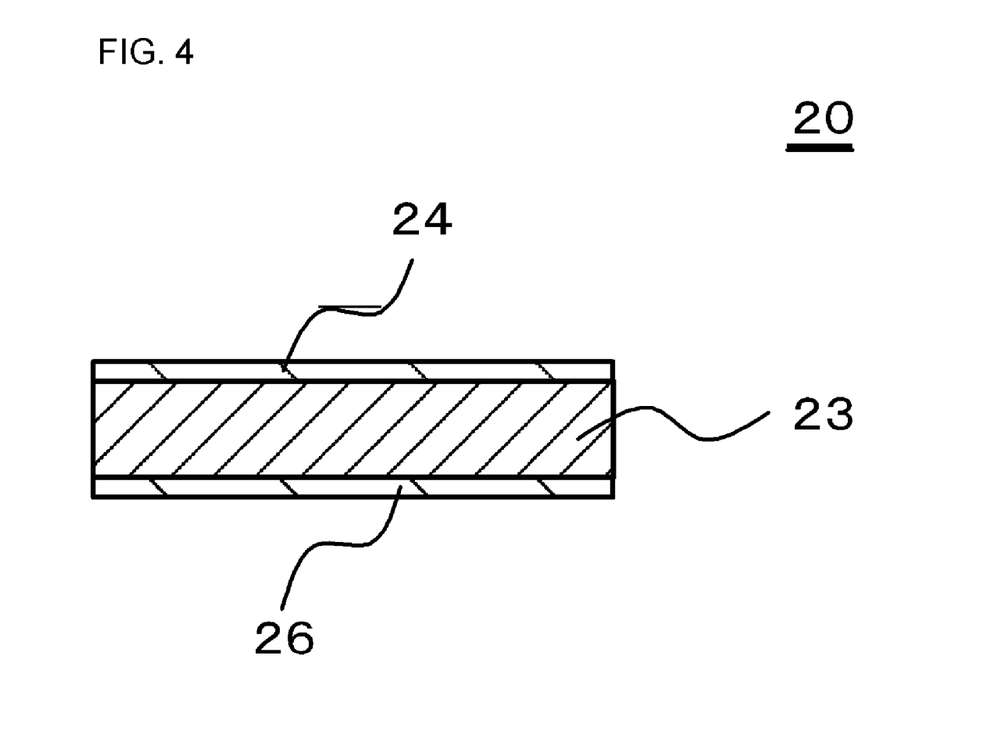
FIG. 4 is a cross section illustrating a layer structure of an oscillator.

FIG. 4 is a cross section illustrating the layer structure in the thickness direction of the oscillator 20. The oscillator 20 has a piezoelectric body 23, a top-surface electrode 24, and an under-surface electrode 26.

The piezoelectric body 23 is polarized in the thickness direction. The material of the piezoelectric body 23 may be any of an inorganic material and an organic material as long as the material has a piezoelectric effect. A material having high electromechanical conversion efficiency, for example, piezoelectric zirconate titanate (PZT) or barium titanate ($BaTiO_3$) is preferable. Thickness h1 of the piezoelectric body 23 is, for example, 10 μm to 1 mm. In the case where the thickness h1 is less than 10 μm, there is the possibility that the oscillator 20 is broken during the process of manufacturing the speaker. In the case where the thickness h1 is larger than 1 mm, there is the possibility that the electromechanical conversion efficiency becomes too low, and oscillation of sufficient greatness cannot be obtained for the following reason. When the thickness of the oscillator 20 increases, the electric field intensity in the piezoelectric oscillator decreases in inverse proportion.

As the material of the top-surface electrode 24 and the under-surface electrode 26, although not limited, for example, silver or silver/palladium may be used. Since silver is used as a low-resistance general electrode material, it is advantageous from the viewpoint of manufacture process, cost, and the like. Silver/palladium is a low-resistance material having excellent oxidation resistance, so that it is advantageous from the viewpoint of reliability. Although thickness h2 of the top-surface electrode 24 and the under-surface electrode 26 is not limited, the thickness h2 is preferably 1 μm to 50 μm. When the thickness h2 is less than 1 μm, it is difficult to uniformly form the top-surface electrode 24 and the under-surface electrode 26. As a result, there is the possibility that the electromechanical conversion efficiency may deteriorate. In the case where the thickness of the top-surface electrode 24 and the under-surface electrode 26 exceeds 100 μm, the top-surface electrode 24 and the under-surface electrode 26 becomes restrain surfaces to the piezoelectric body 23, and there is the possibility that the energy conversion efficiency deteriorates.

The oscillator 20 may be set to outside diameter=Φ18 mm, inside diameter=Φ12 mm, and thickness=100 μm. As the top-surface electrode 24 and the under-surface electrode 26, for example, silver/palladium alloy having a thickness of 8 μm (whose weight ratio is, for example, 7:3) may be used. As the oscillating member 30, phosphor bronze having an outside diameter of Φ20 mm and a thickness of 50 μm (0.3 mm) may be used. The supporting member 40 functions as the case of the speaker 60 and is formed in a cylindrical shape having, for example, an outside diameter of Φ22 mm and an inside diameter of Φ20 mm.

The case where the speaker 60 is a parametric speaker will now be described. A parametric speaker emits ultrasonic waves (carrier waves) subjected to AM modulation, DSB modulation, SSB modulation, and FM modulation from a plurality of oscillation sources into the air and, by nonlinear characteristic when the ultrasonic wave propagates in the air, makes audible sound. The non-linearity indicates transition from laminar flow to turbulent flow, which appears when the Reynolds number indicated by the ratio between inertial action and viscous action of flow increases. Since sound waves are slightly disturbed in a fluid, the sound waves propagate nonlinearly. Particularly, in the ultrasonic frequency band, nonlinearity of the sound waves can be easily observed. In the case where the ultrasonic waves are emitted into the air, harmonics accompanying nonlinearity of sound waves are generated markedly. The sound waves are in a sparse/dense state in which molecular density varies in the air. In the case where it takes time for decompression of air molecule more than compression, air which cannot be decompressed after compression collides with air molecules which continuously propagate, and shock wave is generated. By the shock wave, audible sound is generated, that is, audible sound is reproduced (demodulated). The parametric speaker has an advantage of high directivity of sound and a property of high straightness of sound.

Since the straightness of the sound waves which are output from the parametric speaker is high, attenuation of sound waves due to incidence to the internal circumference of the sound emission hole 4 and the waveguide 5 can be suppressed. Consequently, as compared with a case of using a general speaker which outputs audible sound, the diameter of the sound emission hole 4 and the waveguide 5 can be largely decreased. Although FIG. 1 illustrates an example where one sound emission hole 4 is provided, the number of sound emission holes 4 may be plural.

By dividing the sound emission hole 4 into plural parts, opening space of each of the sound emission holes 4 can be reduced, and waterproof property can be increased.

In the case of using a general speaker which outputs audible sound, total area of a sound emission hole formed in a casing, which is, for example, about 10 $mm^2$ is necessary. That is, in the case where the number of sound emission holes in one speaker is 10, the area of each of the sound emission holes of about 1 $mm^2$ is necessary. The wider the area of the sound emission hole is or the larger the number of sound emission holes is, the higher the possibility that water penetrates to the inside of the casing via the sound emission hole is (that is, waterproof property deteriorates). On the other hand, in the case of using a parametric speaker, it is sufficient that the total area of the sound emission hole 4 is, for example, 3 $mm^2$ or less (concretely, about 1 $mm^2$).

The number of the sound emission holes 4 may be, for example, five or less. Consequently, as compared with the case of using a general speaker, waterproof property can be increased dramatically.

In the case of a general speaker, the total area of the sound emission hole of about 1/20 of the area of the speaker is necessary. On the other hand, in the case of a parametric speaker, the total area of the sound emission hole 4, which is about 1/50 of the area of the parametric speaker is sufficient. The reason is that, as described above, the sound wave output from the parametric speaker has high straightness.

Figure 5:
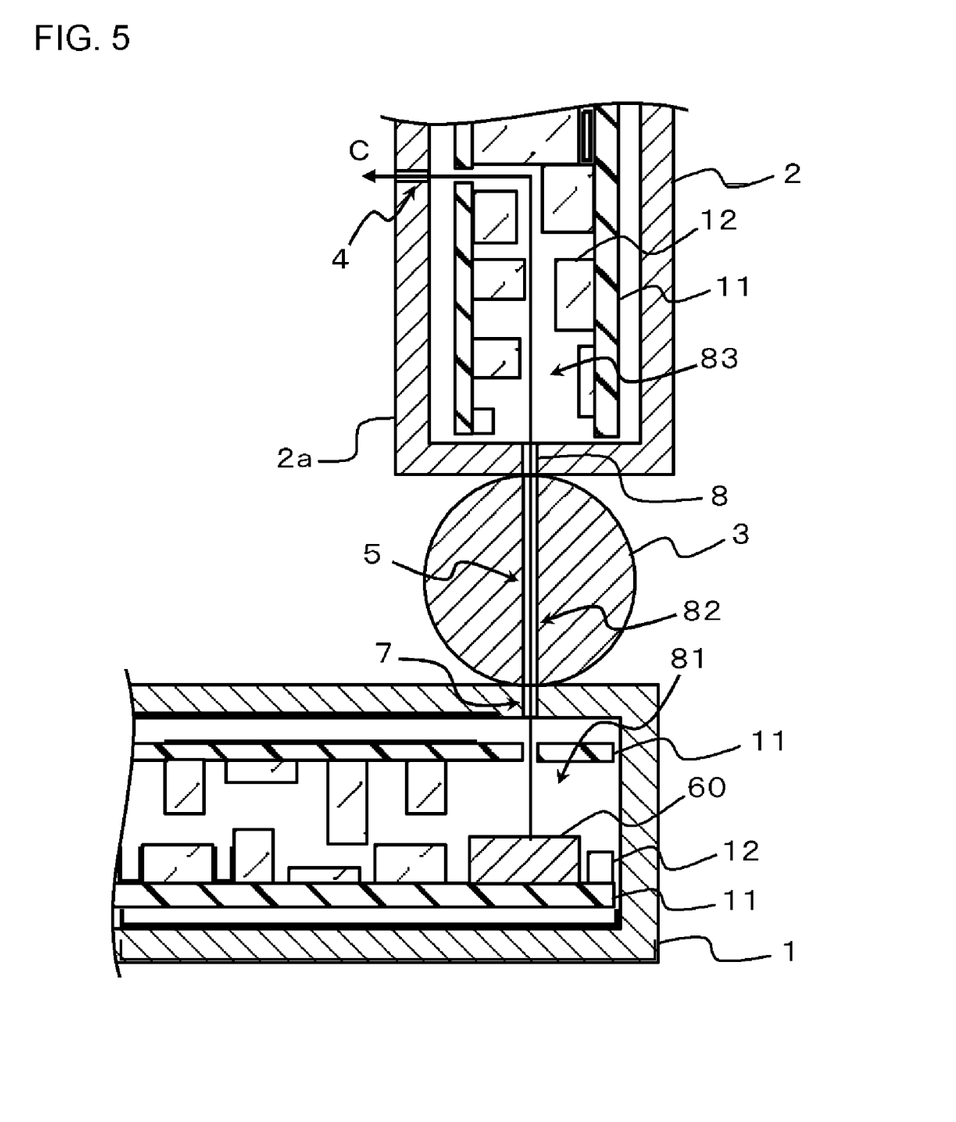
FIG. 5 is an enlarged view of FIG. 1(a).

Next, an example of the more concrete configuration of the waveguide 5 will be described. FIG. 5 is a schematic enlarged section of the portable terminal device. It is a precondition that the speaker 60 is a parametric speaker.

As illustrated in FIG. 5, the waveguide 5 includes, for example, a first inner waveguide 81 which extends in the first casing 1, a first sound communication hole 7 which is formed in the first casing 1 and is communicated with the first inner waveguide 81, an in-hinge waveguide 82 which is communicated with the first sound communication hole 7 and extends in the biaxial hinge 3, a second sound communication hole 8 which is formed in the second casing 2 and is communicated with the in-hinge waveguide 82, and a second inner waveguide 83 which is communicated with the second sound communication hole 8 and extends in the second casing 2.

A sound wave generated from the speaker 60 passes through the first inner waveguide 81, the first sound communication hole 7, the in-hinge waveguide 82, the second sound communication hole 8, and the second inner waveguide 83 in this order, after that, passes through the sound emission hole 4, and is emitted in the direction of arrow C.

The first sound communication hole 7, the in-hinge waveguide 82, and the second sound communication hole 8 are positioned coaxially with the second axis. Consequently, even when the second casing 2 turns about the second axis with respect to the first casing 1, the first inner waveguide 81, the first sound communication hole 7, the in-hinge waveguide 82, the second sound communication hole 8, and the second inner waveguide 83 are maintained in a state where they are communicated to each other. Therefore, in any of the states of FIGS. 2(a) to 2(c), voice from the speaker 60 can be emitted from the sound emission hole 4.

Preferably, a part of the first and second inner waveguides 81 and 83 is positioned coaxially with the second axis.

In the first casing 1, a circuit board 11 and various components 12 mounted on the circuit board 11 are provided. The speaker 60 is also mounted on the circuit board 11. The components 12 are, for example, electronic parts such as discrete parts or semiconductor packages. Similarly, the circuit board 11 and the components 12 are provided also in the second casing 2.

The circuit board 11 and the components 12 are disposed so that no obstacle is positioned on a straight line connecting any part of the oscillation face of the speaker 60, that is, any part of the oscillating member 30 and the oscillator 20 and any part of the first sound communication hole 7 in order not to disturb the sound wave which is output from the speaker 60 from reaching the first sound communication hole 7. Preferably, between the circuit board 11 and the component 12, there is a gap in a straight line shape having a diameter of 0.3 mm or less (for example, about 0.1 mm) connecting any part of the oscillating member 30 and the oscillator 20 and any part of the sound emission holes 4. Since the sound wave output from the parametric speaker has high straightness, the sound wave can be guided to the sound emission hole 4 through the gap.

The second inner waveguide 83 extending from the second sound communication hole 8 to the sound emission hole 4 is assured so as not to disturb the sound wave introduced into the second casing 2 via the first sound communication hole 7, the in-hinge waveguide 82, and the second sound communication hole 8 from reaching the sound emission hole 4. The second inner waveguide 83 is, for example, a path which is bent at 90° at some midpoint. Consequently, the components 12 and the circuit boards 11 are disposed along the path, and the sound wave is guided along the path. The diameter of the second inner waveguide 83 may be 0.3 mm or less (for example, about 0.1 mm) like that of the first inner waveguide 81.

According to the first embodiment as described above, in the portable terminal device in which the first and second casings 1 and 2 are coupled to each other via the biaxial hinge 3, the orientation of the second casing 2 about the second axis and the emission direction of voice from the speaker 60 provided in the first casing 1 may be interlocked. Particularly, in the case where the speaker 60 is a parametric speaker, the directivity of sound is high, so that the interlockingness can be further increased.

In the case of the embodiment, concretely, the orientation of the display screen 6a and that of the sound emission hole 4 are always the same. Consequently, a change in the orientation of the display screen 6a according to turn of the second casing 2 about the second axis and the emission direction (the direction of arrow C) of voice from the speaker 60 are synchronized. Therefore, regardless of the turn phase of the second casing 2 about the second axis, the user can hear voice while seeing the display screen 6a without any strange feeling.

Second Embodiment

Figure 6:
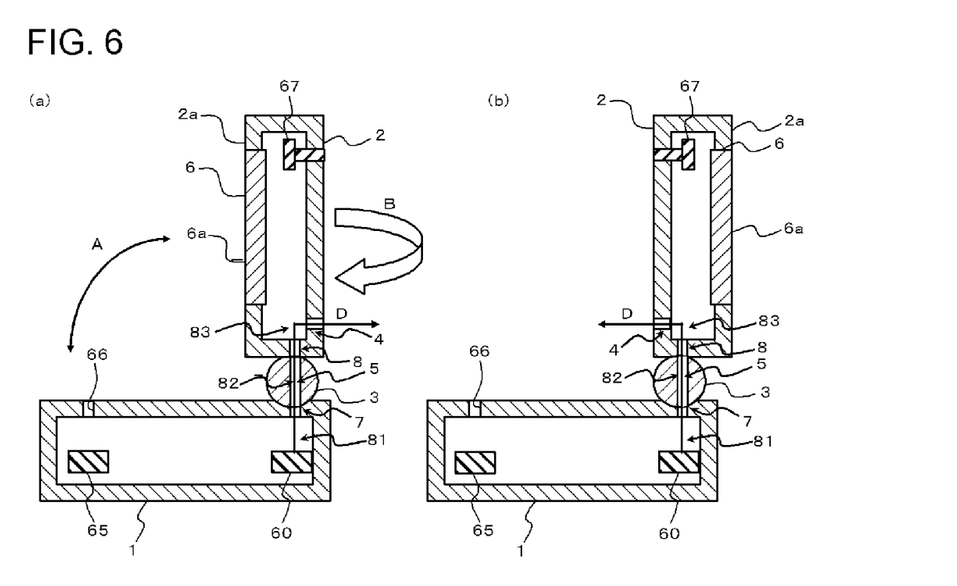
FIGS. 6(a) and 6(b) are schematic sectional side views of a portable terminal device according to a second embodiment.

FIGS. 6(a) and 6(b) are schematic sectional side views of a portable terminal device according to a second embodiment. The orientation of the second casing 2 in FIG. 6(a) and that in FIG. 6(b) are opposite to each other.

In the case of the embodiment, the sound emission hole 4 is formed in the rear face of the face in which the display screen 6a is disposed in the second casing 2. Consequently, in the case of the embodiment, different from the first embodiment, the orientation of the display screen 6a and that of the sound emission hole 4 are always opposite.

For example, a microphone 65 is provided in the first casing 1. In a position corresponding to the microphone 65 in the first casing 1, a sound communication hole 66 is formed. Voice on the outside of the first casing 1 enters the first casing 1 through the sound communication hole 66 and may be collected by the microphone 65.

The portable terminal device can, for example, emit the voice collected by the microphone 65 from the speaker 60.

The portable terminal device has an image pickup device 67, and the field of view of the image pickup device 67 is in the direction opposite to the display screen 6a using the second casing 2 as a reference. By making an operation unit perform an image capturing operation while making the display screen 6a function as the finder of the image pickup device 67, an image may be captured by the image pickup device 67.

For example, the user of the portable terminal device can utter voice of an instruction to a subject (for example, "to the right", "smile", "Say cheese!", or the like) to the microphone 65 while making the display screen 6a as a finder. In this case, the voice generated from the speaker 60 is emitted in the direction opposite to the display screen 6a (the direction of arrow D in FIGS. 6(a) and 6(b)), that is, toward the subject (the direction of the field of view of the image pickup device 67).

As described above, in the case of the embodiment, a use mode of emitting voice like a loudspeaker toward a subject may be mentioned as an example.

At the time of capturing an image by an image pickup device such as a cellular phone, a predetermined click sound (for example, "snap" sound) is automatically output for the purpose of preventing camera voyeurism and the like. In the case of the embodiment, by outputting the click sound from the speaker 60, the click sound is always output toward a subject, so that the camera voyeurism suppressing effect can be increased.

In the case of using a parametric speaker having high directivity of sound as the speaker 60, there is also another use method. For example, the user captures an image of a person (second user) to whom the user wishes to deliver his/her voice by the image pickup device 67. It is assumed that an image captured is output to the display screen 6a, and the display screen 6a may be used as a real-time monitor. By inputting a conversation or the like with the second user to the microphone 65 while using the display screen 6a as a monitor, the second user can selectively hear the voice. This is effective to a case such that, for example, in a stadium or the like in which cheers in the surrounding are loud, the user wishes to deliver a voice message to a person in some distance (for example, about a few meters to tens meters (concretely, about 50 meters is also possible)).

Except for the point, the portable terminal device according to the embodiment is constructed in a manner similar to the portable terminal device according to the first embodiment.

The second embodiment can obtain effects similar to those of the first embodiment.

Third Embodiment

Figure 7:
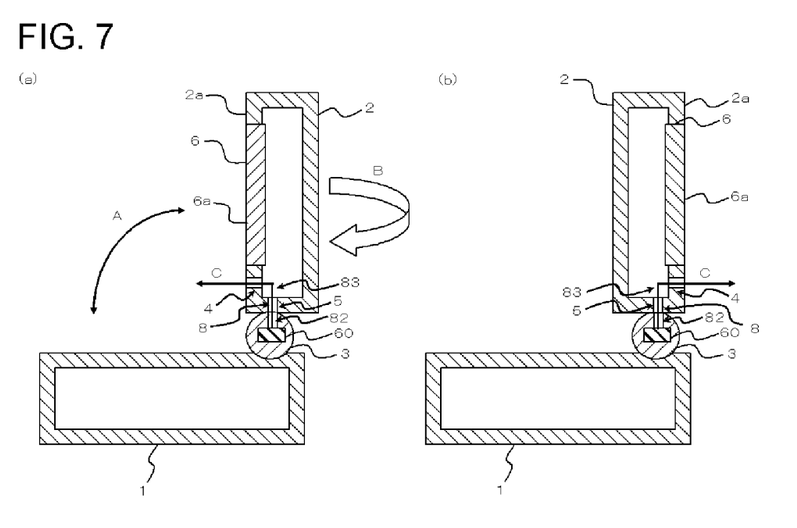
FIGS. 7(a) and 7(b) are schematic sectional side views of a portable terminal device according to a third embodiment.

FIGS. 7(a) and 7(b) are schematic sectional side views of a portable terminal device according to a third embodiment. The orientation of the second casing 2 in FIG. 7(a) and that in FIG. 7(b) are opposite to each other.

In each of the foregoing embodiments, the example in which the speaker 60 is provided in the first casing 1 has been described. In the third embodiment, the speaker 60 is provided in the biaxial hinge 3. Consequently, in the case of the embodiment, the waveguide 5 does not have the first inner waveguide 81 and the first sound communication hole 7. The in-hinge waveguide 82 is positioned in a path extending from a second sound communication hole 8 to the speaker 60.

Although FIGS. 7(a) and 7(b) illustrate an example in which the orientation of the sound emission hole 4 is similar to that in the first embodiment, the orientation of the sound emission hole 4 may be similar to that in the second embodiment.

In the case of the embodiment, the in-hinge waveguide 82 and the second sound communication hole 8 are positioned coaxially with the second axis and, preferably, a part of the second inner waveguide 83 is also positioned coaxially with the second axis.

Also by the third embodiment, effects similar to those of the first embodiment can be obtained.

Fourth Embodiment

Figure 8:
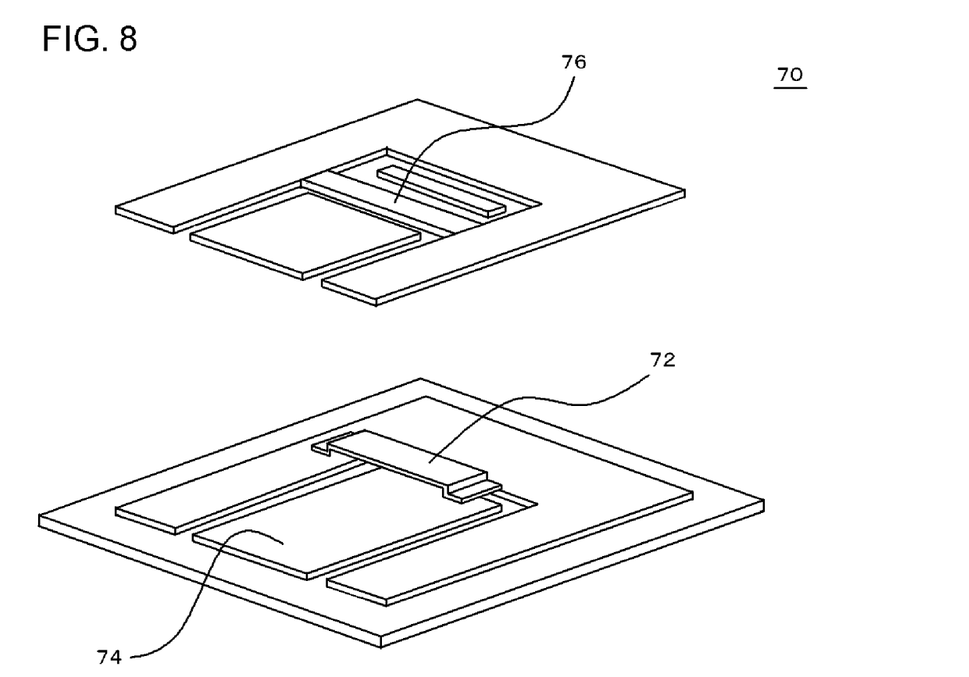
FIG. 8 is an exploded perspective view illustrating the configuration of an MEMS actuator used as an oscillator of a speaker of a portable terminal device according to a fourth embodiment.

The speaker 60 of a portable terminal device according to a fourth embodiment has a micro electro mechanical system (MEMS) actuator 70 illustrated in FIG. 8 in place of the oscillator 20. Except for the point, the portable terminal device of the embodiment is constructed in a manner similar to the portable terminal devices of the foregoing embodiments.

In the example illustrated in FIG. 8, the driving method of the MEMS actuator 70 is a piezoelectric driving method, and the MEMS actuator 70 has a structure in which a piezoelectric thin layer 72 is sandwiched by an upper movable electrode layer 74 and a lower movable electrode layer 76. The MEMS actuator 70 operates when a signal is supplied from the signal generating unit 54 to the upper movable electrode layer 74 and the lower movable electrode layer 76. For manufacture of the MEMS actuator 70, for example, an aerosol deposition method is used. However, this is not limited to the method. It is preferable to use the aerosol deposition method for a reason that each of the piezoelectric thin layer 72, the upper movable electrode layer 74, and the lower movable electrode layer 76 can be formed also on a curved surface. The driving method of the MEMS actuator 70 may be an electrostatic driving method, an electromagnetic driving method, or a thermal conduction driving method.

Although the embodiments of the present invention have been described above with reference to the drawings, they are examples of the present invention, and various configurations other than the above can be also employed.

For example, the portable terminal device may further include a sound absorbing member (not illustrated) which faces an emission end of the waveguide 5 (for example, in a part positioned coaxially with the sound emission hole 4 in the waveguide 5). By the sound absorbing action by the sound absorbing member, the directivity of the sound wave emitted via the waveguide 5 can be further increased. The reason is that the sound wave which travels along the extension direction of the waveguide 5 in the waveguide 5 is selectively emitted from the waveguide 5 and, on the other hand, a part of the sound wave traveling in a direction deviated from the extension direction in the waveguide 5 is incident on the sound absorbing member and is absorbed. The sound absorbing member may be, for example, a porous material such as urethane.

The present application claims priority based on Japanese Patent Application No. 2010-171006 filed on Jul. 29, 2010 and incorporates all of the disclosure herein.

The invention claimed is:

1. A portable terminal device comprising:
   a first casing;
   a second casing;
   a biaxial hinge mutually coupling the first and second casings, axially supporting the first and second casings about a first axis so that the first and second casings can open and close relative to each other, and axially supporting the second casing so the second casing can turn with respect to the first casing about a second axis which crosses the first axis;
   a speaker provided in the first casing;
   a sound emission hole from which sound waves generated from the speaker are emitted;
   a waveguide guiding the sound waves generated from the speaker to the sound emission hole; and
   a display device provided for the second casing,
   wherein each of a display screen of the display device and the sound emission hole is disposed in a face whose orientation changes when the second casing turns about the second axis, in the second casing,
   wherein the waveguide comprises:
   an in-hinge waveguide extending in the biaxial hinge,
   a fist sound communication hole which is formed in the first casing and communicates with the in-hinge waveguide,
   a second sound communication hole which is formed in the second casing and communicates with the in-hinge waveguide, and
   an inner waveguide which communicates with the second sound communication hole and extends in the second casing,
   wherein the in-hinge waveguide and the first sound communication hole are positioned coaxially with the second axis.

2. The portable terminal device according to claim 1, wherein the sound communication hole is formed in a face in which the display screen is disposed in the second casing.

3. The portable terminal device according to claim 1, wherein the sound emission hole is formed in a rear face of the face in which the display screen is disposed in the second casing.

4. The portable terminal device according to claim 1, wherein the speaker comprises:
   a sheet-shaped oscillating member;
   an oscillator attached to one of faces of the oscillating member;
   a supporting member which supports a periphery of the oscillating member; and
   an input unit which supplies an oscillation signal to the oscillator to make the oscillator oscillate, and makes sound waves oscillated by the oscillator and the oscillating member.

5. The portable terminal device according to claim 4, wherein the input unit makes the oscillator oscillate at a frequency of 20 kHz or higher, thereby making a sound wave whose frequency is 20 kHz or higher oscillated by the oscillator and the oscillating member.

6. The portable terminal device according to claim 4, wherein the oscillator is a piezoelectric oscillator.

7. The portable terminal device according to claim 4, wherein the oscillator is a micro electro mechanical system (MEMS).

\* \* \* \* \*